United States Patent [19]

Belsky et al.

[11] 4,287,030

[45] Sep. 1, 1981

[54] PROCESS FOR PRODUCING HIGH-PURITY INDIUM

[76] Inventors: Arkady A. Belsky, Komsomolsky prospekt, 48/22, kv. 20; Alexandr V. Eljutin, 3 Frunzenskaya ulitsa, 7, kv. 176, both of Moscow; Valery N. Zubkov, ulitsa V. Dubinina, 6/29, kv. 16, Podolsk Moskovskoi oblasti; Alexandr I. Konjukov, Bolshaya Akademicheskaya ulitsa, 39 "V", kv. 37, Moscow; Lidia I. Krasinskaya, Otkrytoe shosse, 17, korpus 8, kv. 155, Moscow; Elena A. Nekrasova, Novye Cheremushki, kvartal 32-a, korpus 10, kv. 14, Moscow; Konstantin S. Nizharadze, ulitsa Dorozhnaya, 20, korpus 1, kv. 72, Moscow; Larisa F. Markova, ulitsa Shkolnaya, 12, kv. 3, Vidnoe Moskovskoi oblasti; Mirra G. Mirskaya, ulitsa Bolshaya Cherkizovskaya, 9, korpus 1, kv. 171, Moscow; Alexei V. Frolov, ploschad Pobedy, 2, korpus 2, kv. 176, Moscow; Evgeny A. Judin, ulitsa Medikov, 29, korpus 3, kv. 16, Moscow, all of U.S.S.R.

[21] Appl. No.: 150,949

[22] Filed: May 19, 1980

[51] Int. Cl.$^3$ .............................................. C25C 1/22
[52] U.S. Cl. ................................ 204/105 R; 75/65 R
[58] Field of Search ..................... 204/105 R; 75/65 R

[56] References Cited

U.S. PATENT DOCUMENTS

| 3,049,478 | 8/1962 | Morawietz | 204/150 R |
|---|---|---|---|
| 3,180,812 | 4/1965 | Beau | 204/150 R |
| 3,268,425 | 8/1966 | Pursley | 204/59 |
| 3,268,426 | 8/1966 | Lavitt | 204/105 R |
| 3,897,317 | 7/1975 | Bawa | 204/105 R |

*Primary Examiner*—R. L. Andrews
*Attorney, Agent, or Firm*—Fleit & Jacobson

[57] ABSTRACT

A process for producing high-purity indium which comprises vacuum melting of the metal in two stages: in the first stage at a temperature of from 850° to 940° C. for 1–5 hours; in the second stage at a temperature of from 950° to 1,100° C. for 0.5–2 hours. Thereafter, the metal is subjected to an electrochemical refinement in a hydrochloric acid solution, while the residue of indium evolved on the cathode is remelted by introducing into molten indium at a temperature of from 160° to 400° C.

2 Claims, No Drawings

PROCESS FOR PRODUCING HIGH-PURITY INDIUM

The present invention relates to the non-ferrous metallurgy and, more specifically, to a process for producing high-purity indium.

FIELD OF THE INVENTION

The process according to the present invention is useful for purification of metallic indium from accompanying contaminants such as zinc, cadmium, thallium, copper, nickel and the like. These contaminants are present in indium usually upon its manufacture from various starting raw materials.

At the present time indium finds an extensive use in the manufacture of semiconductors. Being an acceptor dope, indium imparts, to germanium and silicon, a "hole"-type conductivity, thus enabling its utilization for creation of n-p transitions. A wide-scale application of indium is facilitated due to the fact that it easily wets the surface of germanium and is well alloyed therewith at a low temperature.

Semiconductor compounds based on indium phosphide, indium arsenide and antimonide are of great practical interest. Indium antimonide features a high electron mobility and is employed in the manufacture of Hall transmitters and IR-detectors. Indium phosphide is used in the manufacture of high-temperature transistors, while indium arsenide is employed in the manufacture of low-temperature transistors, thermistors and optical instruments.

In the manufacture of indium-based semiconductors it is necessary to use indium of a high purity with a content of the main substance at the level of 99.999–99.99999% by mass the amount of limited dopes being controlled.

BACKGROUND OF THE INVENTION

The principal source of metallic indium is represented by complex ores containing a number of valuable components. Thus, lead-zinc ores which are main raw materials for the production of metallic indium also contain sulphur, selenium, tellurium, copper, cadmium, arsenic, thallium, gallium, germanium and other components. Indium produced from this starting material contains a substantial amount of contaminating components which may be removed by combination of several methods for purification of indium; each of said methods being effective for purification from only individual limited impurities in the metal.

Known in the art is a method for producing high-purity indium using transfer reactions (cf. FRG Pat. No. 1,229,304 Cl. 40a 61/00; 1966). This process makes it possible to produce the metal with a content of the main substance of 99.999 to 99.9999% by mass. The process contemplates creation, in the reaction vessel, of a temperature drop, preferably 100° C.; molten indium within the range of higher temperatures is subjected to the influence of a gas mixture of hydrogen and water vapours. As a result, molten indium is oxidized into a lower oxide which is transferred to the reactor zone having lower temperature and reduced, therein, to the highpurity metal. This process features a low productivity and necessitates high power and labour costs.

In the prior art process for the production of high-purity indium by chlorination of metallic indium, followed by processes of rectification, zone melting and disproportionation of the purified monochloride it is possible to obtain indium with a content of the main contaminants of the order of $10^{-5}\%$ by weight (cf. Bronnikov A. D., Vasilevskaja I. I., Niselson L. A., Nikolaev R. K., Smirnov V. A., Izvestija AN SSSR, Metals, 1974, No. 4, p. 54). However, the use of chlorine or chlorine-containing products complicates the process equipment, necessitates special safety precautions, while an increased hygroscopicity of indium monochloride hinders effective zone melting and rectification processes. Among other disadvantages of the process there should be mentioned its multi-stage character and increased losses of indium reaching 10%.

The process for electrolytical refining of indium (cf. U.S. Pat. No. 3,268,425; Cl. 204–105, Int.Cl. B 01 K; 1966) stipulates anodic dissolution of indium containing an increased amount of impurities. The hydrochloric-acid solution has a pH value of 0.5 to 1 and contains chlorides of indium and sodium in an amount of about 80 g/l. Graphite cathodes are uniformly positioned between the anodes; recovery of of purified indium takes place on said cathodes. During electrochemical refining of indium there occurs the exchange of the electrolyte solution with its purification on ion-exchange resins of a quaternary ammonium base. The process makes it possible to produce indium of an increased purity; however, metallic indium deposited on the cathode has an extremely developed surface thus causing an enhanced oxidation of the metal, entrainment of the electrolyte and, finally, contamination of the purified metal and lowered yield of the final product. The process does not enable a sufficiently deep purification of the metal (below $1.10^{-5}\%$ by mass) from a number of limited impurities such as thallium, cadmium, zinc, lead and others.

Known in the art is a process for electrolytical refining of indium from an acidic solution using, as the cathode, metallic mercury (cf. Japanese Patent No. 427/1970; Cl. 10P23, 1970). However, the use of mercury complicates safety conditions during refining of indium, gives rise to the problem of purification of indium and amalgam saturated with impurities from mercury.

In another prior art process (cf. Reinststoffe Wissenschaft und Technik, Berlin, 1963, 91–104) use is made of amalgam electrolysis of indium, followed by vacuum melting of indium at a temperature within the range of from 550° to 600° C. under a residual pressure in the chamber of from $1.10^{-4}$ to $1.10^{-5}$ mm Hg over a period of from 3 to 4 hours. The resulting metallic indium contains 99.999% by mass of the main substance. This prior art process has the same disadvantages as those inherent in the above-described one.

Also known is a process for producing high-purity indium (Polish Application No. 65539; Cl. 40 c 1/06 1972), wherein indium with an increased content of impurities is dissolved in hydrochloric acid, neutralized with a solution of ammonia; afterwards, the indium-containing solution is purified by cementation of the impurities on indium sheets of a high purity, while indium is isolated from the resulting solution by electrolysis, heated in vacuum at the temperature of above 1,000° C.

In the above process there take place substantial losses of the purified metal due to the multi-stage process scheme, large amounts of the solutions employed and high temperatures of vacuum treatment of the metal. The multi-stage character of the process exerts a detrimental effect on purity of the resulting final product.

SUMMARY OF THE INVENTION

The present invention is directed to the provision, in a process for the production of high-purity indium, of such process parameters which would make it possible to increase the degree of indium purity simultaneously with reducing its losses. It is an object of the present invention to increase the degree of purity of indium simultaneously with lowering losses thereof.

This object is accomplished by that in a process for producing high-purity indium involving vacuum melting and electrochemical refining of the metal in a hydrochloric-acid solution, in accordance with the present invention, vacuum melting of the metal is carried out in two stages: in the first stage at a temperature within the range of from 850° to 940° C. for a period of from 1 to 5 hours, in the second stage at a temperature of from 950° to 1,100° C. for a period of from 0.5 to 2 hours, whereafter the metal is subjected to electrochemical refining in a hydrochloric-acid solution and the residue of indium recovered at the cathode is remelted by introducing it into molten indium at a temperature within the range of from 160° to 400° C.

It is advisable to conduct said electrochemical refining of the metal in a hydrochloric-acid solution at a concentration of indium chloride in the solution of from 120 to 200 g/l in the presence of thiourea and/or gelatin at a concentration of from 0.1 to 0.7 g/l and cathodic current density of from 0.015 to 0.03 A/cm$^2$.

The process according to the present invention makes it possible to produce metallic indium of an increased purity with the content of the main contaminants at the level of $10^{-6}\%$ by mass and lower the metal losses by 3–6%.

DETAILED DESCRIPTION OF THE INVENTION

Other objects and advantages of the present invention will now be more fully apparent from the following detailed description of the process and specific examples illustrating its embodiments.

Commercial contaminated indium is subjected to vacuum melting which is effected in two stages: the first at a temperature of from 850° to 940° C. for a period of from 1 to 5 hours, the second—at a temperature of from 950° to 1,100° C. for 0.5 to 2 hours.

The two-stage process of vacuum melting of indium ensures in the first stage an effective removal of high-volatile impurities of sulphur, selenium, tellurium, cadmium, zinc and others; in the second stage it ensures an effective removal of less volatile impurities of thallium, lead and others. The selected temperature conditions in the first and second stages of the process exclude the formation of low volatile intermetallic compounds with indium, since the content of said impurities does not exceed, as a rule, $1.10^{-3}\%$ by mass. The selection of the time interval for carrying out the process of vacuum melting of indium in the first and second stages is defined by the purity of the final product and losses of the metal. Thus, carrying out the process in the first stage of vacuum melting at a temperature of below 850° C. for one hour and in the second stage at a temperature of below 950° C. for a period less than 0.5 hour does not make it possible to produce indium with the content of impurities of lead, thallium, and other elements suitable for the subsequent electrochemical refining. The content of these impurities remains at the level of $n.10^{-3}$–$n.10^{-4}\%$ by mass for every individual impurity. Carrying out the vacuum melting process at the extreme maximum values of temperature and time results in substantial losses of metallic indium reaching 15%. After the vacuum melting process the metal is subjected to electrochemical refining.

It is preferable to conduct the electrochemical refining stop at a concentration of indium chloride in the solution of from 120 to 200 g/l in the presence of thiourea and/or gelatin at a concentration of from 0.1 to 0.7 g/l and cathodic current density of from 0.015 to 0.03 A/cm$^2$.

At a concentration of indium chloride below 120 g/l the current yield is lowered, whereas at a concentration of indium chloride in the electrolyte above 200 g/l the metal losses are increased due to entrainment of the electrolyte with the cathodic residue. Increasing concentrations of thiourea and gelatin in the electrolyte above 0.7 g/l and using cathodic current density values above 0.03 A/cm$^2$ also result in a lowered current yield. At the same time, concentrations of thiourea and gelatin below 0.1 g/l do not ensure the production of the cathodic metal of an increased purity relative to impurities of lead, copper, nickel and others; carrying out the process of electrochemical refining at a current density of below 0.01 A/cm$^2$ lowers the process productivity.

The residue of indium recovered at the cathode is remelted by introducing it into molten indium at a temperature within the range of from 160° to 400° C.

Carrying out the process of remelting of the resulting cathodic metal without a flux-indium-results in the formation of a large amount of a dark-grey slag consisting mainly of a mixture of chloride and oxide compounds of indium. The metal losses due to oxidation amount in this case to 45% and over.

It should be noted that carrying out the process of fusing the cathodic metal into molten indium at a temperature below 160° C. causes a longer duration of the process and the formation of up to 15% of oxide films on the metal surface, whereas the use of the process temperature above 400° C. causes losses of indium due to the formation of both oxide films and lower indium chlorides resulting from the reaction between indium and the residual hydrochloric acid non-removed by washing. The amount of indium flux ranges from 10 to 20% by mass of the remelted cathodic metal; the flux ensures coating of the surface of the immersed cathodic indium.

For a better understanding of the present invention, some specific Examples are given hereinbelow by way of illustration.

EXAMPLE 1

Commercial indium containing, % by mass: nickel $1.10^{-3}$, copper $1.10^{-3}$, lead $2.10^{-3}$, thallium $5.10^{-3}$, cadmium $1.10^{-3}$, tin $4.10^{-3}$, sulphur $3.10^{-3}$, selenium $4.10^{-4}$ is subjected to vacuum melting at the temperature of 850° C. for 2.5 hours, whereafter the temperature is elevated to 970° C. and the metal is maintained at this temperature for 45 minutes. The process of vacuum melting is carried out in vacuum of $2.10^{-5}$ mm Hg under the conditions of agitation of the metal. Afterwards, the metal is cooled to a temperature of from 380° to 450° C. and cast into graphite moulds, wherein the metal is crystallized. The entire operation is carried out under vacuum of $2.10^{-5}$ mm Hg. Losses of indium to sublimates do not exceed 3%.

The crystallized and cooled metal with the content of impurities (% by mass): copper $1.10^{-3}$, lead $1.10^{-4}$, thallim $6.10^{-5}$, tin $4.10^{-3}$, nickel $1.10^{-3}$; cadmium, sulphur, selenium and zinc—below $5.10^{-5}$ of each serves as the anode in the subsequent operation of electrochemical refining.

The surface of cast anodes contains no oxide inclusions; it is smooth and glossy. This provides for stable conditions of electrolysis.

The process of electrochemical refining of indium is carried out at the concentration of indium chloride in the electrolyte of 150 g/l in the presence of thiourea and gelatin in the concentrations of 0.3 and 0.1 g/l respectively.

The process of electrochemical refining is carried out at the cathodic current density of 0.025 A/cm² on the cathode made of titanium. On this cathode a dense, uniform residue is deposited which is readily removed from titanium sheet. The current yield is 99.8%. The yield of the high-purity metal after electrochemical refining is 96%.

The resulting cathodic deposit is washed with slightly acidified water, then with water and dried at a temperature of about 55° C., whereafter fused into molten indium in a graphite cup at the temperature of 200° C.

As the flux, use is made of high-purity indium with the content of the above-listed impurities within the range of $n.10^{-5}$ to $n.10^{-6}$% by mass.

The thus-produced compact metal contains, % by mass: lead below $1.10^{-5}$, tin $1.10^{-5}$, copper below $5.10^{-6}$, nickel $1.10^{-5}$, zinc below $5.10^{-6}$, thallium below $2.10^{-5}$, cadmium below $1.10^{-5}$, sulphur and selenium—below $5.10^{-5}$ each. The metal yield to the commercial product is 94%.

EXAMPLE 2

As the starting metal use is made of indium with the following content of impurities, % by mass: copper $8.10^{-3}$, lead $8.10^{-3}$, thallium $6.10^{-3}$, tin $5.10^{-3}$, nickel $8.10^{-4}$, cadmium $1.10^{-3}$, sulphur $3.10^{-3}$, selenium $5.10^{-4}$. Following the sequence of operations as described in the foregoing Example 1, purification of metallic indium is carried out under the following conditions: the first stage—temperature 850° C., duration 5 hours; the second stage—temperature 950° C., duration 0.5 hour; electrochemical refining is conducted in a hydrochloric-acid solution at the concentration of indium chloride of 120 g/l in the presence of thiourea in the concentration of 0.1 g/l and gelatin—0.5 g/l at the cathodic current density of 0.015 A/cm².

The cathodic indium produced on the titanium plate is fused into the molten indium flux at the temperature of 170° C. As a result, the thus-produced metal contains the following impurities, % by mass: lead below $1.10^{-5}$, tin below $1.10^{-5}$, copper $6.10^{-6}$, nickel $5.10^{-6}$, zinc below $5.10^{-6}$, thallium below $2.10^{-5}$, cadmium below $1.10^{-5}$, sulphur and selenium below $5.10^{-6}$ each. The metal yield to the commercial product is 95%.

EXAMPLE 3

As the starting metal use is made of indium with the content of impurities specified in Example 2 hereinabove. Following the sequence of operations as in Example 1, purification of metallic indium is carried out under the following conditions: the first stage of vacuum melting—temperature 940° C., duration 1 hour; the second stage of vacuum melting—temperature 1,100° C. and duration 1.5 hour; electrochemical refining is conducted at the concentration of indium chloride of 200 g/l in the presence of 0.5 g/l of thiourea and 0.2 g/l of gelatin at the cathodic current density of 0.030 A/cm². The cathodic indium produced on the titanium sheet is fused into the molten indium-flux at the temperature of 400° C. The thus-produced metal contains the following amounts of impurities, % by mass: lead below $1.10^{-5}$, tin below $1.10^{-5}$, copper $7.10^{-6}$, nickel $5.10^{-6}$, zinc below $5.10^{-6}$, thallium below $2.10^{-5}$, cadmium below $1.10^{-5}$, sulphur and selenium below $5.10^{-5}$ each. The metal yield to the commercial product is 96%.

EXAMPLE 4

As the starting metal use is made of indium with the following content of impurities, % by mass: copper $1.10^{-2}$, lead $2.10^{-3}$, thallium $5.10^{-3}$, tin $1.10^{-2}$, nickel $1.10^{-3}$, cadmium $1.10^{-3}$, sulphur $5.10^{-3}$, selenium $5.10^{-4}$. Following the sequence of operations described in the foregoing Example 1, purification of indium is conducted under the following conditions: the first stage of vacuum melting—temperature 900° C., duration 1 hour; the second stage of vacuum melting—temperature of 1,000° C., duration 1 hour; electrochemical refining is conducted at the concentration of indium chloride of 150 g/l in the presence of 0.1 g/l of thiourea at the cathodic current density of 0.02 A/cm².

The indium deposit obtained at the graphite cathode is fused into the molten indium flux at the temperature of 250° C. The resulting metal contains the following amounts of impurities, % by mass: copper $5.10^{-6}$, lead below $1.10^{-5}$, thallium below $2.10^{-5}$, tin below $1.10^{-5}$, nickel $3.10^{-6}$, zinc below $5.10^{-6}$, cadmium below $1.10^{-5}$, sulphur and selenium below $5.10^{-5}$. The yield of the metal to the commercial product is 93%.

EXAMPLE 5

The starting indium containing, % by mass: copper $3.10^{-3}$, lead $1.10^{-3}$, thallium $6.10^{-3}$, tin $1.10^{-3}$, nickel $5.10^{-3}$, cadmium, sulphur, selenium and zinc $1.10^{-3}$ each is subjected to vacuum melting first at the temperature of 900° C. for two hours and then at the temperature of 1,100° C. for 0.5 hour. Electrochemical refining is conducted in a hydrochloric-acid solution at the concentration of indium chloride of 150 g/l in the presence of 0.7 g/l of thiourea and at the cathodic current density of 0.03 A/cm². The process of electrochemical refining is carried out along with continuously purifying the electrolyte by cementation on plates of high purity indium. The resulting cathodic indium is fused into the molten indium flux at the temperature of 300° C. The thus-produced metal has the following content of impurities, % by mass: copper $3.10^{-6}$, lead below $1.10^{-5}$, thallium below $2.10^{-5}$, tin below $1.10^{-5}$, nickel $3.10^{-6}$, zinc below $5.10^{-6}$, sulphur, selenium below $5.10^{-5}$ each. The metal yield to the final commercial product is 94%.

EXAMPLE 6

The starting indium contains impurities in the amounts specified in Example 5 hereinabove. Following the sequence of operations described in Example 1, purification of metallic indium is carried out under the following conditions: the first stage of vacuum melting—temperature 870° C., duration 2 hours; the second stage of vacuum melting—temperature 950° C. and duration 2 hours; electrochemical refining is conducted at the concentration of indium chloride of 130 g/l in the presence of 0.5 g/l of gelatin and at the cathodic current density of 0.02 A/cm$^2$. Indium is deposited on an indium plate. The resulting cathodic indium is fused into the molten indium flux at the temperature of 250° C. The thus-produced metal has the following content of impurities, % by mass: copper $3.10^{-6}$ lead below $1.10^{-5}$, thallium below $2.10^{-5}$, tin below $1.10^{-5}$, nickel below $5.10^{-6}$, zinc below $5.10^{-6}$, sulphur and selenium below $5.10^{-5}$ each. The yield of the metal to the final commercial product is 95%.

What is claimed is:

1. A process for producing high-purity indium comprising vacuum melting of the metal in two stages: in the first stage at a temperature ranging from 850° to 940° C. for a period of from 1 to 5 hours; in the second stage at a temperature ranging from 950° to 1,100° C. for 0.5–2 hours, followed by electrochemically refining the metal in a hydrochloric acid solution and remelting of the residue of indium evolved on the cathode by introducing into molten indium at a temperature of from 160° to 400° C.

2. A process according to claim 1, wherein said electrochemical refining of the metal in a hydrochloric acid solution is carried out at a concentration of indium chloride in the solution of 120 to 200 g/l in the presence of thiourea and/or gelatin in a concentration of from 0.1 to 0.7 g/l and at a cathodic current density of from 0.015 to 0.03 A/cm$^2$.

* * * * *